United States Patent
White

(10) Patent No.: US 8,607,830 B2
(45) Date of Patent: Dec. 17, 2013

(54) APPARATUS AND METHOD FOR FLOWING COMPRESSED FLUIDS INTO AND OUT OF CONTAINMENT

(75) Inventor: Charles N. White, Houston, TX (US)

(73) Assignee: EnerSea Transport LLC, Houston, TX (US)

( * ) Notice: Subject to any disclaimer, the term of this patent is extended or adjusted under 35 U.S.C. 154(b) by 0 days.

(21) Appl. No.: 13/599,857

(22) Filed: Aug. 30, 2012

(65) Prior Publication Data

US 2013/0056111 A1 Mar. 7, 2013

Related U.S. Application Data

(62) Division of application No. 12/072,996, filed on Feb. 29, 2008, now Pat. No. 8,281,820.

(60) Provisional application No. 60/904,541, filed on Mar. 2, 2007, provisional application No. 60/926,504, filed on Apr. 27, 2007.

(51) Int. Cl.
*B65B 31/00* (2006.01)

(52) U.S. Cl.
USPC .............................................. 141/37; 141/11

(58) Field of Classification Search
USPC ............ 141/18, 37, 39, 51, 94, 37.2, 389, 11, 141/82
See application file for complete search history.

(56) References Cited

U.S. PATENT DOCUMENTS

| | | |
|---|---|---|
| 3,232,725 A | 2/1966 | Secord et al. |
| 3,293,011 A | 12/1966 | Lewis et al. |
| 3,298,805 A | 1/1967 | Secord et al. |
| 3,613,932 A | 10/1971 | Yamamoto |
| 3,831,811 A | 8/1974 | Becker |
| 4,010,622 A | 3/1977 | Etter |
| 4,139,019 A | 2/1979 | Bresie et al. |

(Continued)

FOREIGN PATENT DOCUMENTS

| | | |
|---|---|---|
| CA | 2532748 A1 | 7/2006 |
| WO | WO/PCT/US89/02916 | 1/1989 |
| WO | WO 90/00589 | 1/1990 |
| WO | WO 0036333 | 6/2000 |

OTHER PUBLICATIONS

International Search Report and Written Opinion for International Application No. PCT/US2008/002755 issued Nov. 19, 2009.

(Continued)

*Primary Examiner* — Davis Hwu
(74) *Attorney, Agent, or Firm* — Stephen S. Hodgson

(57) ABSTRACT

Methods for loading a compressed fluid into and discharging the compressed fluid out of containment are provided. Compressed fluid is injected into a bottom portion of a container system for storage and/or transport until a target pressure is reached after which gas is withdrawn from an upper portion of the container system at a rate to maintain the target pressure while the compressed fluid is injected in the bottom portion. The compressed fluid is cooled through an expansion valve and by refrigerated chillers or by injecting a cold liquid of the same chemical composition as the compressed fluid into the compressed fluid prior to injection into the container system. Discharge from the container system to a receiving facility begins with blow down from the bottom portion of the container system without a displacement fluid and continues until pressure falls below an acceptable differential pressure.

33 Claims, 3 Drawing Sheets

(56) References Cited

U.S. PATENT DOCUMENTS

| | | | |
|---|---|---|---|
| 4,213,476 | A | 7/1980 | Bresie et al. |
| 4,446,804 | A | 5/1984 | Kristiansen et al. |
| 4,456,459 | A | 6/1984 | Brundige |
| 4,563,201 | A | 1/1986 | Brundige |
| 5,199,266 | A | 4/1993 | Johansen |
| 5,231,838 | A | 8/1993 | Cieslukowski |
| 5,253,682 | A | 10/1993 | Haskett et al. |
| 5,603,360 | A | 2/1997 | Teel |
| 5,803,005 | A | 9/1998 | Stenning et al. |
| 5,839,383 | A | 11/1998 | Stenning et al. |
| 5,934,081 | A | 8/1999 | Notaro et al. |
| 6,003,460 | A | 12/1999 | Stenning et al. |
| 6,012,530 | A | 1/2000 | Korsgaard |
| 6,019,174 | A | 2/2000 | Korsgaard |
| 6,044,647 | A | 4/2000 | Drube et al. |
| 6,112,528 | A | 9/2000 | Rigby |
| 6,202,707 | B1 | 3/2001 | Woodall |
| 6,230,809 | B1 | 5/2001 | Korsgaard |
| 6,237,347 | B1 | 5/2001 | Rigby |
| 6,339,996 | B1 | 1/2002 | Campbell |
| 6,539,747 | B2 | 4/2003 | Minta et al. |
| 6,584,781 | B2 | 7/2003 | Bishop et al. |
| 6,652,243 | B2 | 11/2003 | Krasnov |
| 6,655,155 | B2 | 12/2003 | Bishop et al. |
| 6,725,671 | B2 | 4/2004 | Bishop et al. |
| 6,863,474 | B2 | 3/2005 | Webster et al. |
| 6,932,121 | B1 | 8/2005 | Shivers, III |
| 6,932,128 | B2 | 8/2005 | Turan, Jr. |
| 6,964,180 | B1 | 11/2005 | Shivers, III |
| 7,069,730 | B2 * | 7/2006 | Emmer et al. ............... 62/50.1 |
| 7,137,260 | B2 | 11/2006 | Perry |
| 7,155,918 | B1 | 1/2007 | Shivers, III |
| 7,219,682 | B2 | 5/2007 | Agnew et al. |
| 2002/0046773 | A1 | 4/2002 | Bishop et al. |
| 2007/0017575 | A1 | 1/2007 | Hall et al. |

OTHER PUBLICATIONS

International Search Report and Written Opinion for corresponding International Application No. PCT/US2008/002755 issued Nov. 19, 2009.

* cited by examiner

APPARATUS AND METHOD FOR FLOWING COMPRESSED FLUIDS INTO AND OUT OF CONTAINMENT

CROSS REFERENCE TO RELATED APPLICATIONS

This is a divisional of U.S. patent application Ser. No. 12/072,996 filed on Feb. 29, 2008, which is incorporated by reference, which issued as U.S. Pat. No. 8,281,820 on Oct. 9, 2012. Priority is claimed to U.S. Provisional Patent Application Ser. Nos. 60/904,541 and 60/926,504, each of which was filed by the present inventor on Mar. 2, 2007, and Apr. 27, 2007, respectively, and each is incorporated by reference. U.S. patent application Ser. No. 12/074,183 filed by the present inventor on Feb. 29, 2008, which claims priority to the same provisional patent applications, entitled "Storing, Transporting and Handling Compressed Fluids" is related hereto and incorporated by reference.

BACKGROUND OF THE INVENTION

1. Field of the Invention

The present invention pertains to apparatus and methods for handling fluids, and more particularly to apparatus and methods for charging a compressed fluid into or discharging the compressed fluid out of containment, including into and out of a storage or transport container.

2. Description of the Related Art

Gases are stored and transported under pressure to reduce the volume of the gas. Numerous gases, including air, nitrogen, oxygen, hydrogen, ethane and propane, are compressed for storage and transport, and natural gas is a gas commonly compressed. The term "natural gas" as used in this document refers to light hydrocarbon compositions that are dominated by the methane molecule, but may be comprised of heavier hydrocarbon molecules as well as limited non-hydrocarbon impurities (such as water, carbon dioxide, and nitrogen) in any proportion that would exist as gas vapor at ambient temperature and pressure. This "natural gas" may have originated as a naturally occurring fluid stream extracted from the earth or as synthetically combined mixture of molecules created for the purposes of storage and/or transport in or on some form of mobile platform (such as a ship, railcar, or truck trailer). Compressed natural gas may be referred to simply as CNG, whether refrigerated or not. Pressurized liquid natural gas or pressurized natural gas liquid, often referred to as PLNG herein, is deeply refrigerated but may not necessarily be stored at temperatures below the critical temperature of methane.

Compressed fluids have been typically contained in relatively (or very) long cylinders, bullet tanks, oblate spheroids or spheres that all feature at least one circular cross-section cut and have relatively high wall thickness to diameter ratios (t/D) to resist the pressure-induced hoop stresses because the materials used to fabricate these essentially rigid containers are of limited effective strength in the orientation of the critical stresses (whether metallic or fiber-based matrix shells or hybrid composites thereof).

Many advancements have been made that concern storing and transporting compressed fluids efficiently. See, for example, the following patents and patent applications, each of which is incorporated by reference: U.S. Pat. No. 6,584,781, issued to Bishop et al., U.S. Pat No. 6,655,155, issued to Bishop, and U.S. Pat. No. 6,725,671, issued to Bishop, and U.S. Patent Application Pub. Nos. 20020046547, filed by Bishop et al. and assigned Ser. No. 09/943,693 and 20030106324, filed by Bishop et al. and assigned Ser. No. 10/316,475, each of which is believed to be assigned to Enersea Transport, LLC of Houston, Tex., and are collectively referred to as "the Bishop patents." The Bishop patents consider that the mass ratio for circular cylinders can be commercially optimized by selecting storage pressures that minimize the compressibility factor Z for temperatures below about −10° C. while keeping the cargo stored as a dense phase fluid. U.S. Pat. Nos. 3,232,725 and 3,298,805 are incorporated by reference, each of which issued to Secord et al. and are collectively referred to as "the Secord patents." The Secord patents describe temperature and pressure ranges for efficiently containing a compressed natural gas in a dense phase and/or in mixed phase.

Existing art does not adequately address the challenges of efficiently loading and discharging compressed fluids, particularly pressurized, refrigerated natural gas cargos, which would be useful for establishing commercially attractive storage and transport services. If a displacement practice is not adopted for loading and unloading of pressurized gas cargos, expansion and recompression of gases within the containment can result in heat energy build up within storage containers, which impacts the efficiency undesirably. See U.S. Pat. No. 6,655,155, issued to Bishop and incorporated by reference, referred to herein as "Bishop," which describes a method for using a displacement liquid to load or offload compressed gas from a gas storage system. A cargo displacement system can avoid undesirable aspects of cargo expansion and compression during both loading/charging and unloading/discharging operations.

Such a system requires that the cargo enter and exit primarily through a pathway that serves as both entry and exit while the displacement fluid enters and exits by an opposing pathway. If a liquid is being used to displace a less dense fluid (e.g., CNG or PLNG) cargo, then the cargo enters and leaves primarily by way of top piping connections while the displacement liquid enters and exits by pathways disposed at the bottom of containment. If the displacement fluid is a light gas over a denser cargo fluid, then the cargo will enter and exit by way of a bottom or lower end path (e.g., a nozzle or dip tube). The displacement gas will enter and exit primarily by top end pathways. Under certain conditions (e.g., emergencies), it may be desirable to switch the means of access and egress for the fluids and for either displacement approach.

Bishop uses a cold, non-freezing liquid as the displacement fluid (such as an ethylene glycol and water blend) for loading and discharging cold CNG. Bishop uses a low pressure gas (possibly nitrogen) to push the displacement liquid back out of the tanks after the liquid has displaced the cargo or traps and expands a small gas cap of cargo fluid left on top of the displacement. See U.S. Pat. No. 6,202,707, issued to Woodall et al. and incorporated by reference, which is referred to as "Woodall" herein and U.S. Pat. No. 7,219,682, issued to Agnew et al. and incorporated by reference, which is referred to as "Agnew" herein. In a manner analogous to Bishop, Woodall uses a dense, non-freezing liquid to displace lighter PLNG out the tank tops for discharging PLNG cargo, while Agnew proposes an approach similar to both Bishop and Woodall to displace a warmer compressed natural gas cargo fluid out of topside piping manifolds. Woodall uses submersible pumps inside the tanks to recover and distribute the displacement liquid after it has discharged the cargo from the tanks. Woodall and Agnew both recommend filling the void created in the tanks when the displacement liquid is drained or pumped out and over to a subsequent tank (or tier of tanks) with a low pressure gas, while Woodall further suggests that gas recovered from the discharged cargo stream could be used to fill the void. See also U.S. Pat. No. 6,932,121, issued to Shivers III and incorporated by reference, which is referred to as "Shivers" herein. Shivers proposes injecting a warm gas from a remote salt dome reservoir into the topsides of the tanks to displace a very cold liquid cargo (PLNG) out the bottom side piping connections in a reversal of the processes described by Bishop, Woodall, and Agnew.

The amount of residual gas remaining in storage after normal discharge operations is another issue that challenges existing compressed gas storage and transport concepts because this quantity of gas, frequently called heel, cannot be sold.

If a blow-down method is employed instead of one of the displacement schemes just described, the gas discharge rate will drop as the driving pressure within storage approaches the back pressure of the receiving system and will eventually stop discharging completely when the pressures balance. To overcome this back-pressure problem and avoid leaving commercially punitive quantities of heel gas in the cargo tanks, expensive scavenging compressor elements are inserted into the gas extraction system to allow a draw down from containment to lower pressures. The cost and effectiveness of scavenging compression systems are impacted by the compression ratio needed to push gas into pressurized receiving infrastructures (e.g., a gas transmission pipeline) by raising the pressure of discharging gas from an inlet pressure that is dropping relative to the back pressure imposed by the receiving infrastructure.

The mass of residual or heel gas left in the container is a function of the final pressure, temperature, and composition of the gas within the containers, as determined by the scavenging limits of the extraction system compressor(s), and the temperature of the residual gas. During unloading of refrigerated cargos, the temperature of the gas remaining in storage drops, causing its density to increase. Unless the blow down and scavenging cargo discharge operations take place slowly enough for the residual gas to be re-warmed by heat input from the cargo containers and hold spaces, commercially punitive quantities of cargo gas will remain as heel. In commercial scenarios, it is undesirable to warm a deeply chilled containment system up to ambient temperature and impractical to wait the many days needed to do so.

Bishop, Woodall, and Agnew all proposed a liquid displacement solution that uses a liquid which will not freeze at the targeted operating temperatures when it is being used as a liquid piston to displace the cargo from storage. Liquid displacement makes it possible to remove all cargo gas from storage, but the liquid displacement system incurs high costs for acquiring at least one reservoir of the liquid, refrigeration and insulation to keep it at the proper temperature, and a pumping system to drive the liquid into the containment system against its internal pressure. A recommended displacement liquid like ethylene glycol is good from the perspective that it does not interact with (absorb much of) the cargo gas. However, it is not practical to use for operating temperatures much below −30° C. because of increasing viscosity. Further, costly refrigeration systems must be provided to chill the displacement liquid to overcome heat gained during operations and storage.

Alternatively, Shivers employs the displacement method in reverse by using a warm compressed gas from a salt dome reservoir or existing pipeline infrastructure that has a warm gas supply available to displace the cold liquid cargo from storage. Unfortunately, most locations where natural gas deliveries are needed do not have gas readily available from salt formations or excess pipeline gas supplies available to support the operation described by Shivers and, where such a gas source is available, the gas properties may not be compatible with the cargo gas being delivered. Also, the containment systems and piping onboard the vessels described by Shivers are maintained at very low temperatures to keep the cargo in the liquefied form described by Shivers. Injecting very warm or hot gas directly into those structures will cause significant thermal shock and stresses to critical elements of the Shivers system. Further, Shivers indicates that cargo discharging operations are initiated by injecting this warm gas into the top side connections of the containers. However, large amounts of energy are wasted by initiating delivery by pushing the cargo out at the same pressure under which it has been transported.

Woodall and Shivers both describe storing two-phase fluids according to storage conditions suggested by, for example, Secord in rigid cylindrical containers for transport, but neither provide a means for efficiently discharging the cargo to achieve the most commercially attractive delivery of cargo with minimal residual gas volumes remaining on board the transport vessel. Secord also does not address how to best discharge two-phase fluids from rigid cylindrical containers.

U.S. Pat. No. 6,085,528, issued to Woodall et al., U.S. Pat. No. 6,460,721, issued to Bowen et al., and U.S. Pat. No. 7,147,124, issued to Minta et al. describe high strength cylinders for transporting PLNG at low temperatures, but do not describe an efficient way to extract the cargo and minimize mass of the residual product in storage upon delivery to the receiving facilities. Shivers describes a method for driving the PLNG out with very warm gas, but the method is inefficient and limited in its application to very specific delivery points where the warm gas can be collected from a remote source.

U.S. Pat. No. 6,339,996, issued to Campbell and incorporated by reference, which is referred to as "Campbell" herein, and U.S. Pat. No. 5,803,005, issued to Stenning and Cran and incorporated by reference, which is referred to as "Stenning" herein, both address means for blowing gas into and out of high pressure, ambient temperature CNG cylinders. Neither inventor is addressing the approach or systems required to optimize storage efficiency for natural gas cargos at very low temperatures. Campbell addresses means to balance load distribution within a CNG transport ship by moving liquids around between the bottoms of selected individual tanks or banks of tanks via dedicated liquid manifolds connected to the bottom side of vertical CNG cargo cylinders, but does not address the losses of cargo storage efficiency due to blow-in and blow-down of the described cargo fluids. Stenning makes an effort to limit some of the problems with blow-in and blow-down operations, but only addresses ways to move ambient or near-ambient temperature CNG in and out of the tops of CNG cylinders and does not address issues involving substantial liquid quantities therein.

The greater the mass of the residual gas in storage after completion of discharge, the more storage volume required at the storage facility or onboard the means of transport. This means that an even larger number of containers are required to provide a targeted working capacity or volume of cargo stored or delivered. One mitigating measure that limits the financial impact of heel in the cargo transport containers is that some of the heel gas may be used as fuel for a return trip or voyage. However, any residual cargo in excess of that which would be kept onboard ship for fuel is considered permanent heel that imposes a commercial penalty.

Therefore, a need exists for more efficient loading and discharge of compressed fluid cargos (e.g., CNG and PLNG), whether the cargo exists as a simple gas vapor, dense phase fluid, two-phase (vapor over liquid) fluid, or a liquid, such that mass and pressure of residual cargo gas volumes onboard the means of conveyance are minimized, allowing for any fuel supply that may be required for the trip returning to the source of the cargos. A need also exists for an efficient loading and discharge system that can function where no sufficient volume of displacement fluid is available at a cargo receiving facility.

SUMMARY OF THE INVENTION

The present invention provides methods for loading compressed fluids into containment, which can be used for storage and/or transport, and for discharging compressed fluids from containment. While the present invention is particularly applicable to the storage and/or transport of compressed natural gas, the present invention can also be used for other compressed fluids. In one embodiment, the present invention provides a method for loading a compressed fluid into a container by injecting the compressed fluid stream into a first tank until a target storage pressure is reached in the first tank. The first tank has an upper portion and a lower portion, and the compressed fluid stream is injected into the lower portion. Gas is then bled off the upper portion of the first tank while the compressed fluid stream continues to be injected into the lower portion of the first tank. The flow rate of the gas bleed is manipulated to maintain the pressure in the first tank within a desired range about the target storage pressure.

The compressed fluid stream is preferably cooled prior to injection into the first tank, preferably by passing it through a Joule-Thompson let-down valve or an expansion valve. Additional cooling is preferably provided as necessary, and the temperature of the compressed fluid stream is maintained preferably within about 50° C. of the bulk average temperature in the containment and more preferably within about 30° C. Cooling can be provided by refrigerated chillers or by injecting a cold liquid fluid into the compressed fluid stream. If a cold liquid fluid is used, it preferably has substantially the same chemical composition as the compressed fluid stream. For example, if the compressed fluid is compressed natural gas, then the liquid may be liquid natural gas.

Preferably, the gas bled from the upper portion of the first tank flows into a second tank or is used for fuel or another utility purpose. The first tank is preferably shut in while at substantially the same time initiating injection of the compressed fluid stream into the second tank. The second tank has an upper portion and a lower portion, and the compressed fluid stream is injected into the lower portion of the second tank. Gas is preferably bled from the upper portion of the second tank at a controlled rate to maintain a desired temperature within the second tank while injecting the compressed fluid stream into the lower portion of the second tank. If a cold or cryogenic liquid is injected into the compressed fluid for cooling prior to injection into the first tank, it may accumulate as a liquid in the bottom of the first tank along with any liquid that condenses and drops out of the compressed fluid. After the first tank is shut it, the liquid may be withdrawn and recycled for injection into the compressed fluid flowing into the second tank.

In one embodiment a method for loading a compressed fluid into a container is provided, which includes injecting a displacement fluid into a first tank, the first tank having an upper portion and a lower portion, and the displacement fluid is a gas under the conditions inside the first tank. The displacement fluid and/or a compressed fluid is then injected into the first tank until a desired pressure is reached in the first tank, where the compressed fluid is injected into the lower portion of the first tank. After the desired pressure is attained, the displacement fluid is discharged out of the upper portion of the first tank, while continuing to inject the compressed fluid into the lower portion of the first tank. The flow rate of the displacement fluid withdrawn out of the upper portion of the first tank is adjusted or manipulated to maintain the pressure in the first tank within a desired range about the desired pressure. With a back pressure thus maintained by the displacement fluid, the compressed fluid is injected into the lower portion of the first tank until a desired mass of the compressed fluid is contained in the first tank while bleeding the displacement fluid out of the upper portion of the first tank. Preferably, a desired temperature of the compressed fluid is maintained prior to injecting the compressed fluid into the first tank.

In a preferred embodiment, the compressed fluid is compressed natural gas, and the first tank is located on or in a marine vessel, such as a ship or barge. The gas bled off the tanks during the filling operation can be used for fuel to power the marine vessel. Tanks are preferably received in cargo holds in the marine vessel, and tiers of tanks are filled sequentially at a final targeted storage pressure for transport, which is controlled by cascading the withdrawn overhead gas to a next tier, until a desired mass is contained and the tier shut in by closing valves. The cargo holds are preferably insulated, and a chilled fluid is circulated inside the insulated cargo hold and outside the tank for extracting heat from the tanks.

In another embodiment of the present invention, a method is provided for discharging a compressed fluid from containment. A flow path, preferably provided by piping and fluid handling equipment, is provided between a containment system and a receiving system for discharging a compressed fluid that is contained in the containment system into the receiving system, where the pressure in the containment system is higher than the pressure in the receiving system. The containment system has an upper portion and a lower portion, and the flow path connects to the lower portion of the containment system. The compressed fluid is allowed to flow from the lower portion of the containment system to the receiving system, while not adding any fluid into the containment system, until the pressure in the containment system drops to a point such that the actual flow rate in the flow path is at or below a desired flow rate.

In one embodiment, a separator is provided in the flow path for separating the compressed fluid into a lower density stream and a higher density stream, and after the pressure in the containment system drops to the point such that the actual flow rate in the flow path is nearly at or below the desired flow rate, the lower density stream from the separator is injected into a compressor. The lower density stream is compressed to form a displacement fluid, which is injected into the upper portion of the containment system for pushing the compressed fluid out the lower portion of the containment system. It is preferable to avoid thermally shocking the upper portion of the containment system, so it may be necessary to adjust the temperature of the displacement gas. The higher density stream flows to the receiving system.

In another embodiment, the compressor used to form the displacement gas is replaced with a pair of vessels. The displacement fluid is formed by injecting the lower density stream from the separator into a vessel and trapping a desired quantity of the lower density stream in the vessel. The lower density stream is then heated to form a displacement fluid, which is then injected into the upper portion of the containment system for pushing the compressed fluid out the lower portion of the containment system. A tank that is essentially identical to the vessel is placed in a flow configuration parallel with the flow configuration of the vessel. The lower density stream from the separator is injected into the tank while the vessel forms the displacement fluid and while the displacement fluid is injected into the upper portion of the containment system. The vessel and the tank are operated alternately to push the compressed fluid out the lower portion of the containment system. In another embodiment, two heated vessels are operated in a similar fashion to push the higher density stream from the separator to the receiving facilities.

BRIEF DESCRIPTION OF THE DRAWINGS

A better understanding of the invention can be obtained when the detailed description of exemplary embodiments set forth below is considered in conjunction with the attached simplified process flow diagram drawings in which.

None of the drawings is drawn to scale, and the drawings are only intended to illustrate principles, not all of the equipment and instrumentation that may be needed to implement an embodiment of the principles.

DETAILED DESCRIPTION OF THE EXEMPLARY EMBODIMENTS

The present invention provides innovative means for loading a compressed fluid cargo into stationary or transportable cargo containers and for discharging the cargo from the containers. The compressed fluid cargo is typically refrigerated to a stable storage condition at a temperature substantially below 0° C. Since a transport system should address both loading and unloading efficiencies, this invention also addresses means for discharging or withdrawing cargo from the containment system used for storage and/or transportation such that the amount of residual fluid in the containment system (above any amount required as fuel for a return trip) at the end of the withdrawal process is minimized.

The containers described herein may be designed and used to efficiently hold a wide variety of fluids (e.g., gases and gas compositions) in dense pressurized states that may be gaseous, liquid, or mixed phase. The pressures at which natural gas and/or natural gas liquids and their associated or added inert components (collectively referred to often as simply natural gas) are stored and transported are selected to optimize storage efficiency at corresponding operating temperatures (for example, as proposed by Bishop or Secord). When complex natural gases are stored at low enough temperatures, approaching about minus 160° C., the storage pressure may be set at values as low as about 1.5 bar absolute (approximately 22 psia). Many of the components of natural gas are commonly stored as liquids (for example, propane) within about one or two bar guage (14.5-29 psig) of atmospheric pressure by storing at temperatures approaching their atmospheric liquefaction temperatures. Even a light gas like hydrogen can be stored efficiently in containers in a relatively dense form at pressures within a few bar of atmospheric pressure when stored at temperatures below about minus 240° C. The containers mentioned herein may be used at the many combinations of pressure and temperature taught in the Secord and Bishop patents, as well as under the conditions described herein that fall outside those ranges, such as for fluids other than natural gas.

Methods for Charging Compressed Fluids into Containment

Figure 1:
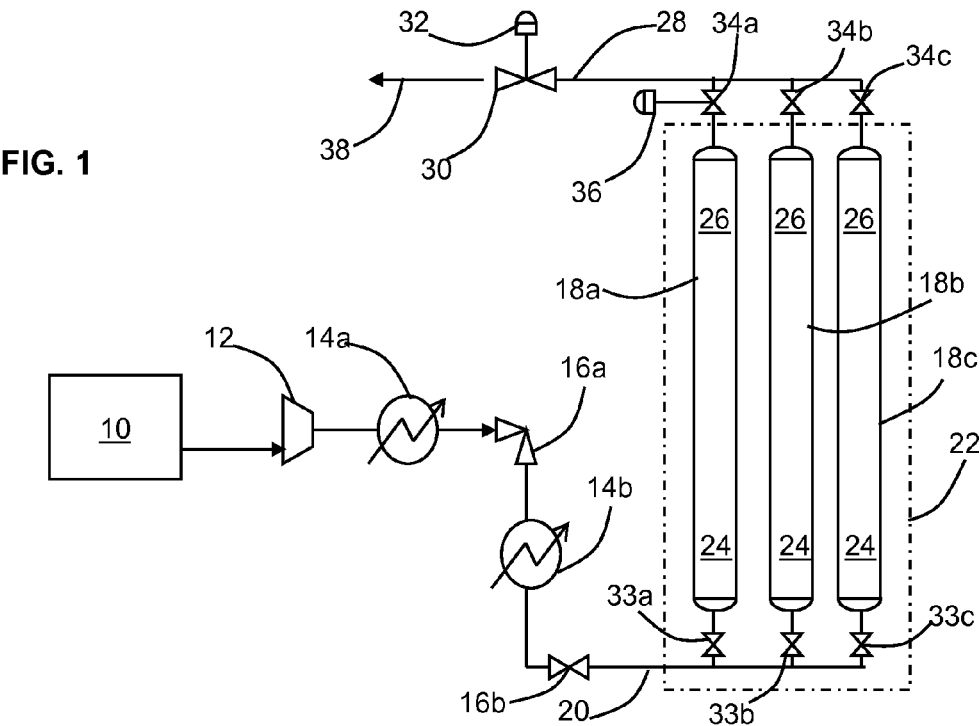
FIGS. 1-3 are schematic flow diagrams for illustrating methods for injecting a compressed fluid into containment, according to the present invention.

With reference to FIG. 1, cargo loading may be managed as a simple blow-in process, where containment tanks are filled from a supply source 10 of cold pressurized cargo that is injected to essentially-empty cargo containers by a positive differential pressure. A compressor 12 may or may not be needed in the flow path, depending on the pressure available from the source. Since this invention targets storage conditions well below 0° C., it is very likely that at least one stage of chilling, which is provided by heat exchangers 14a and 14b, will be required even if the supply pressure is very high relative to the storage pressure. The cargo fluid is passed through a Joule-Thompson let-down valve 16a to take advantage of auto-cooling if any excess pressure is available and through isolation valve assembly 16b into containers 18 through piping 20. Such a blow-in method allows the pressure, temperature, and state of the cargo being injected into containment to change substantially as pressure within containment grows from near ambient to targeted final conditions. The containers 18 and piping 20 should be designed simply to provide adequate capacity and the ability to withstand the range of pressure and temperature conditions experienced during such a loading process. Containers 18 may be conventional thick-walled cylinders or may be tanks or vessels as described in the related invention noted above entitled "Storing, Transporting and Handling Compressed Fluids," the description of which has been incorporated by reference.

Alternatively, pressure, temperature and state of the cargo fluid being injected during loading may be controlled by managing back pressures developed inside containers 18 with a charge of low density gas (possibly, warm light methane) that has been established inside containers 18 prior to the start of chilled cargo injection. The low density gas is allowed to be ejected from the top of containers 18 through a piping manifold 28 by valves 30 at a rate that is managed according to measurements taken by instruments installed on the system being loaded. The initial gas charge does not have to be at the final target pressure, since modern computer simulations can define what back pressure management scheme provides the desired level of pressure, temperature, and phase control on the cargo fluid being injected at any point within the containment or piping and injection equipment upstream of containment where engineering practice would desire to maintain certain conditions and fluid phases to ensure efficient loading operations and performance of the equipment.

The following describes a preferred scenario more specifically. Initially, tanks 18 are considered "empty," although possibly filled with low pressure gas (e.g., cargo/natural gas or inert gas) at a low temperature, but possibly not the final target temperature. The process to fill the empty tanks starts with flow of compressed gas (e.g., natural gas) from the supply source 10 with pressure supplementation by compressor 12 if necessary. Compressed gas is cooled or chilled by passing through the cooling or chilling element 14a, then directed to storage tank 18. If excess pressure is available, the stream may be directed through Joule-Thompson (J-T) valve 16a. Temperature of the cargo flow stream drops further due to J-T effect.

Hydrate inhibitor injection may be required upstream of this point depending on the amount of water in the cargo fluid stream and temperatures and pressures expected to occur during these refrigeration stages of the process. If additional chilling is required, heat exchanger 14b may be used to ensure that fluids entering containment are at the desired injection temperature. More hydrate inhibition may be injected ahead of this stage and liquids knock-out element inserted if needed.

As the cargo fluid stream enters the cargo containers 18 through open valves 16a and piping 20, the coldest, densest fluids will tend to accumulate at a bottom portion 24 of the containers 18 with a gaseous phase above in an upper portion 26. If the cargo is natural gas, natural gas liquids (NGL's) may drop out of the gas due to temperatures occurring within the containers, but the final storage pressure may be selected to prevent or limit drop out. See the Secord and Bishop patents for more information on storage pressures and temperatures. Containers 18 are secured within an insulated enclosure 22 to ensure that low temperatures can be managed as desired for the loading, discharging, and stable storage operations.

Cold cargo fluid (for example, a liquid, a dense phase fluid, or gas over liquids) accumulates in storage tanks 18 behind closed valve assembly 30 as depicted in FIG. 1. Temperature may briefly drop below the final storage target temperature, but materials used in containment should allow for the minimum temperature that occurs from Joule-Thompson effect as well as temporary temperature elevations due to heat of compression.

As fluids accumulate in storage tanks 18, the pressure rises to a point where the temperature of the incoming and accumulated fluids in the containment begins to approach or rise above the targeted final storage temperature. At this point, top valve assembly 30 can be opened under a flow control device 32 to allow some of the warmest gas to be removed for fuel use, recycled for chilling, and/or be displaced under pressure or flow controlled valves over into tanks that have not yet received their charge of cargo fluids. This last option can be a cascading process (tank to tank) or all the remaining uncharged tanks can be receiving fluid discharged from the tank that is currently being loaded.

Compressed gas is initially allowed to blow in to containers 18 from source 10 with possibly some cooling provided by let-down valve 16a and/or chillers 14a and 14b until a target storage pressure is reached in containers 18. Pressure and temperature sensors are provided in containers 18 and/or in piping 28 and/or piping 20.

As cargo fluid enters the bottom of tank 18a through an open valve 33a, lighter, warmer fluid (e.g., methane gas), which accumulated above the colder, denser fluid entering the bottom of the tank, is discharged out an open topside valve 34a under the control of a pressure control device 36 into the topside of tank 18b and tank 18c through valves 34b and 34c. Valves 33b and 33c at the bottom of tanks 18b and 18c are closed so that gas coming in on the topside accumulates in tanks 18b and 18c. Simultaneously, flow control device 32 on valve assembly 30 can allow a proportion of the gas being released from tank 18a to be sent as fuel 38 to equipment locations associated with the cargo containment system (e.g., the engine room on a ship).

By allowing the warmest gas to exit the top as chilled, or even sub-chilled, fluids are directed into the bottom side of the tanks, it is possible to ensure that the targeted (bulk mass average) storage temperature can be achieved prior to shut-in and departure of the transport conveyance. The density of the cargo fluid immediately downstream of the last stage of chilling will be higher than the fluid that is experiencing heat of compression effects within containment. This difference allows the bulk average temperature within containment to be achieved as the final fluids entering the cargo containers can be colder and denser than what has already accumulated in storage and what is being released out of the top.

For further control of the temperature of the fluid in tanks 18, a chilled, inert gas, such as dry air, shipboard IG, or nitrogen, can be circulated within insulated storage enclosure 22 around the outsides of tanks 18. The chilled, inert gas circulated through the space around tanks 18 extracts heat from the tanks 18 and helps to ensure that the targeted storage temperature is achieved when all valves are shut in to isolate contained fluids for storage and/or transportation.

Insulated storage enclosure (cargo hold) 22 can be equipped with one or more fans (certified for a hazardous environment, if necessary) to circulate the chilled, inert gas, and the external surfaces of the individual cargo containers 18 may be modified with a roughened texture or fitted with heat-transfer fins to increase heat transfer from the cargo containers and limit the heat build up as internal pressure increases. This will help to limit or eliminate the need for removing and/or recycling the warm cargo gas near the top of the containers.

Figure 2:
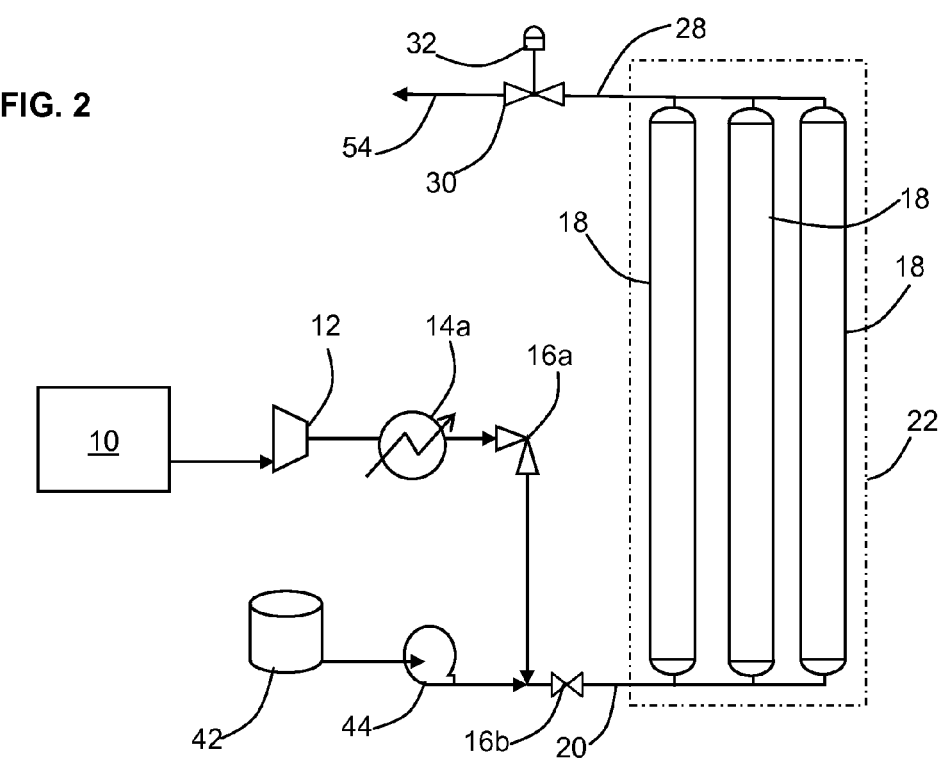

FIG. 2 presents another means for ensuring that the flow stream entering the cargo containers is adequately chilled. In this method, the primary supply gas stream from supply source 10 is mixed with a cryogenic supply of liquid from a reservoir 42 at the loading terminal. By adjusting the rate of mixing (i.e., the ratio of mass of cryogenic liquid to the mass of the primary supply gas), it is possible to control the temperature at which the injected flow stream is entering the cargo containers. U.S. Pat. No. 5,934,081, issued to Notaro et al. and incorporated herein by reference, describes "[a] system for rapidly filling cylinders with gas while avoiding superambient temperature excursions of the cylinder contents wherein cylinder charging gas is produced by vaporizing pressurized cryogenic liquid in admixture with pressurized gas to simultaneously in one step produce the charging gas and control the temperature of the charging gas to enable the subsequent rapid filling rate," according to its abstract. However, Notaro does not address filling large tanks for bulk transport of natural gases at sea. Notaro depends on making sure that the mixed stream is progressively more deeply chilled to overcome heat of compression effects inside a vehicular fuel cylinder so that the final temperature in the closed storage container does not exceed the target storage temperature because the containers in that invention do not have a flow path that would allow warm gas to exit or a means to chill the cargo fluid once inside the containers.

The embodiment shown in FIG. 2 of the present invention provides that large to very large storage tanks onboard ships (or trucks or railcars) or fixed on/in the earth may be filled with a mixed cold fluid stream comprised of gas from the primary source 10 and a cryogenic liquid from a convenient reservoir 42 (e.g., natural gas from a remote gas supply delivered to the terminal by a pipeline mixed with LNG or NGL from storage at that terminal) at a temperature after mixing that is low enough to overcome any heat of compression effects which are not mitigated by heat extraction through the skins of the tanks being loaded and/or by extracting warm, light fluid out of the tops of the tanks for transfer to other cargo containers and/or utility fuel use at the terminal (or onboard ship). If the gas supply from source 10 requires compression 12, then it is likely that some form of heat exchanger 14a for cooling will be included in the system. For example, the necessary cooling may simply be achieved by flowing the compressed cargo stream through a long enough connecting pipeline that would serve as heat exchanger 14a, especially if the pipeline crosses through a body of water.

In this embodiment of the cargo loading process, the temperature of mixed fluids within containment may vary greatly as the internal pressure grows steadily from near ambient to final storage pressure because the topside valve element 30 is closed while the cold mixed stream is injected using a pump 44 through an open valve in bottom-side piping 20. The rate of mixing of the two fluid streams can be adjusted by changing the flow rate through pump 44 to ensure that a gradually colder fluid stream is being injected and such that the final quantities being injected are cold enough to ensure that the targeted final storage conditions are achieved. In general, there is no need for attempting to dissolve the gas stream into the cryogenic fluid. The bulk average temperature of the mixed stream can be managed as described above.

A preferred embodiment of the mixed fluid loading process allows the cargo container to first be filled with relatively warm gas up to the point where the target storage pressure is achieved. An initial gas charge is made by mixing the primary supply gas 10 with the cryogenic fluid from reservoir 42 at a higher warm gas to cold liquid mass ratio than will be used during the cargo charging operation that follows and injecting the relatively warm mixed stream into containment against the closed valve 30. The rise of internal fluid temperature during this pre-charging stage of the filling process can be mitigated to some extent by the extraction of heat through the skin (for example, by the cargo hold air conditioning system described above) while the target internal pressure is achieved. Then, by decreasing the mass ratio of primary supply gas to cryogenic fluid (by increasing the flow rate from reservoir 42 through pumping element 44), a colder mixed fluid stream can be injected into storage against a back pressure that is maintained by pressure-control device 32 on the valve 30 that allows displacement of a warm gas stream 54 out the top of the tank (or group of tanks) being charged over to any tanks (or groups of tanks) onboard that have not yet been fully charged with cargo, to be used as fuel, and/or to be re-mixed with the cargo stream being injected to the storage containers. To avoid thermal shock to the piping and containment systems, the warm fluid (e.g., gas) used as the pre-charge in the process just described is preferably within about 50° C. or so above the targeted final storage temperature, unless these elements are designed to accommodate the stresses of rapid thermal change.

By pre-charging containers some time ahead of the main cargo loading step, any excess heat of compression induced by the pressurization will have time to be mitigated prior to the injection of the coldest cargo stream. A stepwise, cascading loading operation naturally provides the opportunity for heat dissipation whether all tanks on board are pre-charged in segregated tiers just an hour or so ahead of final loading of each tier or simultaneously in a gradual process (within a few hours) ahead of the final step-wise cascading loading operation. It should be noted that as the heat of compression is dissipating, the pressure in the container will drop, so the pre-charge is likely to need to be topped up just before main cargo loading because: 1) the gas inside should be at least about 5 or 10° C. or so warmer and, thus, lighter than the final charging cargo stream, and 2) the back-pressure against which the coldest cargo stream is loading should be at or near the targeted final storage pressure.

Figure 3:
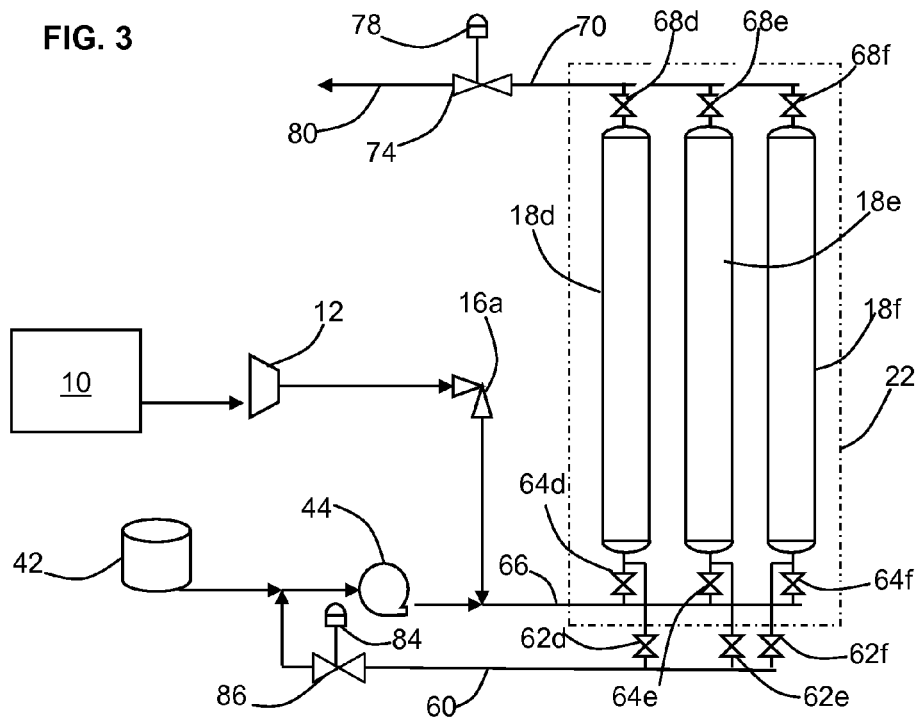

FIG. 3 introduces a parallel piping header 60 for liquids recovery out of the bottoms of tanks 18d, 18e and 18f. Valves 62d, 62e, and 62f are on inlet lines from piping header 60 into tanks 18d, 18e and 18f, respectively. Isolating valves 64d, 64e, and 64f are on lines between tanks 18d, 18e and 18f, respectively, and a piping header 66 on the bottom-side flow path. Topside valves 68d, 68e, and 68f connect tanks 18d, 18e and 18f, respectively, to a header pipe 70 and segregate the tanks such that each tank represents a loading tier. A tier, being a plurality of tanks grouped together for simultaneous loading, may be comprised of one or more tanks, but for simplicity only one tank per tier is depicted.

As shown, tier/tank 18d is already fully charged with mixed fluid cargo and isolated by closure of valves 62d, 64d and 68d. Major cargo isolation valve 74 is closed in preparation for the next phase of operations for loading the entire ship. At this point, some of the coldest, densest liquid may be recovered from the bottom of tier 18d by selective valve operation and returned to the liquid reservoir or mixed with the fluid stream being injected into tanks being subsequently loaded. In FIG. 3, valve 62d on tier 18d can be opened to allow the coldest, densest fluid at the bottom of tier 18d to be extracted under the control of device 84 and valve assembly 86 to the suction side of pump 44 (or possibly to the cryogenic reservoir 42), while the mixed fluid cargo stream is being directed into tier 18e through manifold header 66 and open valve 64e. Valves 62e, 62f, 64d, 64f, 68e and 68f would remain closed. Using any cryogenic liquid that was not vaporized within a tier during its cargo charging process can offer some energy savings with regard to chilling the flow being directed into subsequent tiers.

The rate of mixing between the fluid from the supply source 10 and the cryogenic fluids at the loading terminal depends on many factors, including but not limited to: the pressure, temperature and targeted mass flow rate of the fluid from supply source 10; the molecular weight and temperature of the cryogenic fluids available for mixing; and the rate of heat build up in the containment that is dependent upon the rate at which the combined flow stream is being injected into the containers; the rate at which warmed fluids can be extracted via the topside piping; and/or the rate at which heat can be rejected from the containers.

To prepare for transport, the cargo containment is fully isolated so that the system is ready for conveyance to the discharge location. In the situation where the containment is part of a storage facility serving at a fixed location, this condition is referred as a static storage condition.

The perimeter of the cargo enclosure 22 should be suitably insulated with commercially available insulation materials (for example, sprayed polyurethane foam as is available from TI Marine Contracting A/S) which, along with air conditioning of the cargo spaces, can ensure that internal pressure does not exceed capacity of the containment system or cause the pressure relief valves to release cargo to the environment by limiting the tendency to gain heat from radiation (e.g., solar) or from surrounding fluids (e.g., air or water).

Cargo fluids that warm and rise to the top of the containers may also be extracted as fuel via the topside piping 28 through valve 30 under control of device 32 as needed for fuel to utility (e.g., refrigeration) or transportation operations (e.g., ship propulsion). A fuel conditioning package (not shown) may be inserted between the flow-controlled valve 30 and the engine room to strip off any part of the released fluid stream not matching the fueling requirements. The stripped out side-stream may be re-injected to the storage containers. Any tendency for pressure to rise during a static hold period or transportation to the discharge location may be offset by extracting gas for use as fuel. The insulating properties and thickness of the insulation may be selected such that under typical conditions, the heat gain can ensure that the rate of pressure increase offsets pressure draw down due to extraction of fuel for the ship. To implement the methods described herein, it is preferred to have the necessary sensors (at least pressure, temperature and flow readings), controllers and preferably a computerized control system for managing flows, temperatures and pressures of the various fluid streams.

Also, operation of tank segregation valves to selectively extract cargo fluid can ensure that internal pressure of any individual tank or tier group of interconnected tanks stays within design allowances. The loaded cargo ship will arrive at a port facility, where it can discharge its cargo to the various consumers desiring the mix of cargo fluids on board.

The methods described above can be used for injecting, loading or charging various compressed gases into containment either for storage or for transport. An example of present commercial interest is the transport of natural gas from a gas or oil and gas well or field with a plurality of wells to a location where the natural gas is used, possibly as a fuel or as a chemical feedstock. Gas may be delivered by pipeline from a remote gas field to a sea port, where it can be loaded onto a ship for transport to a location where the gas will be used or consumed. This destination will have receiving facilities, which may be pipeline or storage systems.

Where it is impractical to use a pipeline to transport natural gas from a source to its consumers, a means of contained, mobile transport has been used, which has often been over water using a marine vessel, preferably a ship. There are presently three options for transporting natural gas by ship, namely liquefy the natural gas for transport as LNG, compress the gas into storage tanks for transport at pressure of about 3,000 psi, or compress and refrigerate the gas for transport as a mixed phase or a dense phase fluid, as described in the Secord and Bishop patents respectively, at a pressure of less than 2,000 psi. The LNG option requires a very large capital investment in liquefaction equipment and associated facilities, which can only be justified economically where there is a very large amount of gas to be transported. The high-pressure method has its uses, but requires storage tanks that can withstand the stresses of such high pressures, and such storage tanks have had very thick walls. Consequently, the mass and value of natural gas contained is relatively low compared to the mass and cost of the storage containers required for the high-pressure method. A great deal of metal is transported, but relatively little gas.

The storage options described by Bishop and Secord appear to be a compromise between the cryogenic liquefaction option and the high-pressure option. The large capital investment in liquefaction equipment is avoided, and the very-thick-walled containers of the high pressure method is avoided, so more mass of gas can be transported as compared to the mass of metal that is transported. The Bishop and Secord options become even more attractive when the containers described in the related invention entitled "Storing, Transporting and Handling Compressed Fluids" are used. An example of one of these containers has a square cross-section with rounded corners, possibly measuring 4 meters in width with a 1-m radius for the corners and 10 to 30 m high. The container walls are much thinner than the rigid cylinders used in the prior art and can flex outward and shrink inward a number of wall thicknesses without over-stressing the container. The transport system of the related invention takes advantage of external support that can be provided inexpensively by the walls of a cargo hold, and the rectangular cross-section allows for very efficient use of space, which allows smaller ships to be used.

It is worth examining how the present invention applies in the dense phase option. One objective of the invention is to load as much mass of cargo into a storage container as is desired. If natural gas is just allowed to blow into a container from a high-pressure source, the mass of gas in the container when pressures equalize is much less than the desired mass. The description of the related art describes using a displacement liquid in the storage container as a way of managing the pressure in the container so that a desired quantity of a cold compressed natural gas fluid may be contained in storage. Bishop describes a blend of ethylene glycol and water as a displacement fluid, but facilities, such as pumps and storage tanks, are needed for Bishop's displacement fluid. One advantage of the present invention is that, although a displacement fluid is used to manage pressure in the storage container so that a desired mass of natural gas cargo can be stored in the container, no additional facilities are needed for the displacement fluid. In fact, the natural gas supply intended to be the transported as the cold compressed cargo itself can be used as the displacement fluid, but the displacement fluid is at different pressure and temperature conditions, and consequently has a different density, than the stored cargo fluid.

A displacement fluid is used to manage the pressure inside the storage container, which establishes the back pressure against which the cargo fluid is injected into storage. Consider the following example. Natural gas is collected from numerous wells in a desert or ocean in some remote place in the world and delivered by pipeline to a collection point, where a ship can berth. The gas is either naturally under high pressure because it came from deep within the earth or it has been compressed. The gas in the pipeline is typically between 600 and 2,000 psi and often between 900 and 1200 psi, which may be referred to as compressed natural gas or CNG. A ship berths at the collection point, and pipes and/or hoses are used to provide a flow path from the pipeline to storage containers in cargo holds in the ship. Refrigerated heat exchangers are provided in the flow path, which may be located at the collection point or on the ship, but are preferably associated with the collection point so that separate ships do not each require a refrigeration system beyond that which may be required to keep the cargo within a specified range of the desired storage temperature during transit to its delivery point. If the pressure of the CNG in the pipeline is lower than the pressure desired for storage of the CNG in dense phase on the ship, then it will be necessary to have a compressor in the flow path. An expansion valve or Joule-Thompson let-down valve is preferably provided in the flow path. A number of valves are provided in the flow path including a main valve on the pipeline, a main valve for the ship, and a valve for each storage tank.

The ship berthed at the collection point has empty storage tanks, which are not quite empty because most likely there is a residual heel of gas in the tanks, but are considered empty. In one embodiment of the present invention, the flow path is established to the bottom of a storage tank, which is more likely a tier of a plurality of tanks manifolded together to serve as a single storage tank. Valves are opened and CNG begins flowing into the bottom of the storage tank. Temperature in the flow path is preferably controlled to avoid thermally shocking the pipe and equipment in the flow path or the pipe, valves and storage tanks on the ship. While metal compositions are available that can withstand significant temperature differences over a short period of time, it is more cost effective to use pipe and equipment with a standard metal composition, which can become brittle if cooled too rapidly or if cooled below a minimum temperature. If Bishop's conditions are used for dense phase storage, the temperature of the CNG may be around minus 40° C. and at a pressure between about 1,000 and 2,000 psi, preferably between 1,200 psi and 1,800 psi. If Secord's conditions are used for mixed phase storage, the temperature of the compressed cargo may be range from about minus 160° C. to about minus 40° C., and the pressure may be between about 200 and 1,000 psi. The loading and storage temperature conditions of a compressed fluid can vary widely, but are typically between about minus 180° C. and about 10° C., often between about minus 160° C. to about 0° C., preferably between about minus 140° C. to about minus 40° C., and can be between about minus 120° C. to about minus 60° C. The loading and storage pressure conditions of a compressed fluid can vary widely, but are typically between about 100 psi and about 2,000 psi, often between about 200 psi and about 1800 psi. In the case of dense phase storage of CNG, there is a trade-off between compression and refrigeration, where one can refrigerate more (colder temperatures) and compress less (lower pressures) or refrigerate less (warmer temperatures) and compress more (higher pressures). Bishop recommends selecting the temperature-pressure combination to minimize the compressibility factor of a particular gas in dense phase storage. The pressure of the gas at the collection point, the availability of compression and refrigeration, and the metallurgy of the pipe and storage vessels on the ship are factors considered in determining desired loading and storage temperatures and pressures. The use of a displacement gas in a "gas over dense phase fluid" displacement operation allows the injection of a very cold cargo fluid without exposing piping systems, valves, and tanks potentially damaging drops in temperature by injecting against a back-pressure that manages or eliminates the Joule-Thompson effect.

With the ship berthed, valves in the flow path opened and CNG flowing into the bottom of the storage tank, the temperature of the CNG flowing into the storage tank is controlled to avoid large temperature differences and rapid changes in temperature. For example, depending on the piping design and metallurgy, it may be desirable to keep the temperature difference between the flowing CNG and the storage tank below 60° C., preferably below 50° C., more preferably below 30° C. and most preferably below 20° C. Temperature of CNG on board the ship can be controlled by adjusting the flow rate of CNG through the let down valve or by the amount of heat extracted from the CNG by the refrigerated chillers. Temperature can also be controlled by injecting a cryogenic fluid into the CNG flow path.

The storage tank is initially filled with a displacement gas, which in this example is provided by the CNG that initially flows into the storage tank because the CNG that is initially injected is relatively warm and at a low density compared to the CNG that will be subsequently loaded as cargo. Relatively warm, low density gas flows into storage until a desired pressure is reached in the storage tank (or tier of tanks). The gas now contained in the storage tank is a displacement gas. This displacement gas could be from a different source than the cargo CNG if a different source is available, and it could be injected in the top of the storage tank. It is preferred to use the cargo gas because cargo gas is readily available, and it is preferred to load into the bottom of the tank because that is where the cargo fluid will be injected.

After the displacement gas has filled the storage tank to the desired pressure, which is preferably about the pressure at which it is desired to transport the cargo or is that pressure, cargo loading can begin because there is sufficiently high pressure in the tank to now load a cold, dense compressed natural gas in this example. The temperature of the piping, equipment and storage tank typically drop briefly at the start of the injection of the displacement gas. However, the temperature inside the tank will rise due to heat of compression as the pressure rises to the desired or target pressure. For this example, assume the desired pressure is about 1,200 psi and assume that pressure is the target storage pressure for transport. As the displacement gas fills the tank, only the displacement gas flows into the tank, and no other gas or fluid enters or leaves the tank. However, to avoid confusion in the semantics, it is preferred that the displacement gas be derived from the same source as the cargo fluid, compressed natural gas in this example, so some colder, higher density cargo fluid may temporarily accumulate in the bottom of the storage tank while lower density gas accumulates as displacement gas in the upper portion of the storage tank.

When the pressure of the displacement gas reaches the target pressure, an overhead valve on the top of the storage tank (or tier of tanks) is controllably cracked open a little to allow some of the displacement gas to begin escaping from the storage tank. A pressure control loop is established to maintain the pressure inside the tank, which is preferably a measure of the pressure of the displacement gas in an upper portion of the storage tank. The pressure control loop may be automated control using a sophisticated computer control or it may be a simple control loop from a pressure sensor to a control valve or it may even be a valve that is manually controlled, but the pressure inside the tank should be controlled within a reasonable variability about the target pressure. In this manner back pressure is managed for the cargo loading operation.

As back pressure is maintained in the tank at the target pressure, cold, dense cargo fluid is injected into the bottom of the tank. It may or may not be necessary to adjust the amount of cooling provided for the cargo fluid in the flow path. The let-down valve and one set of refrigerated chillers may have been used while the pressure of the displacement gas was rising to the target pressure, and this may be all that is required for cooling the cargo to a desired temperature. For this example, the target storage pressure, which is the setpoint for the pressure control loop on bleeding off the displacement gas, is about 1,200 psig. A desired bulk average storage temperature corresponding to the 1,200 psi target pressure is, for the sake of illustration in this example, about minus 40° C. One skilled in this art is familiar with the teachings in the Bishop and Secord patents and can determine a desired temperature and a desired mass of cargo to be contained in the storage tank. One objective in loading cargo is to achieve a desired mass of cargo in the storage container, and the present invention helps one achieve that objective. The loading temperature of the cargo is managed by Joule-Thompson expansion effects, by refrigerated cooling and/or by injection of a cryogenic fluid into the cargo fluid in the cargo loading path way. By managing the pressure in the storage container by controllably releasing the warmer, lighter displacement gas that accumulates in the top of the container as colder, denser cargo fluid is loaded into the bottom of the container, a desired mass of cargo can be filled into the container. Temperature is also preferably managed to avoid thermal shock and to achieve a target storage temperature. The mass of cargo in the container can be measured directly with load cells or inferred from calculations based on the composition of the cargo fluid and its pressure and temperature.

Methods for Discharging Compressed Fluids from Containment

While it is possible to initiate simultaneous discharge of both gas phase cargo fluids from the topsides and liquids from the bottom side of storage tanks, the following describes a way in which the liquids may be discharged first. In scenarios where there is very little liquid in storage or where the vast majority of the cargo fluid is in liquid phase, it can make sense to drive out the liquids first. Accordingly, the valves controlling flow through the bottom piping are opened to allow the densest fluids (e.g., liquids) to be discharged first, using the storage pressure to drive these denser fluids out of containment (and off the ship). If a gas phase is present, the gas cap expands and internal temperature will drop, perhaps allowing some additional gas to condense to liquid and drop and flow out, prior to controlled blow down of the gas fraction of the cargo. If necessary to maintain a desired rate of discharge of the dense fluids at the bottoms of the tanks, pressurized low density displacement gas can be injected through the topside piping as needed to continue cargo offloading.

The displacement gas to be used for this purpose, according to this invention, comprises a side-stream off the cargo fluid being discharged from the ship (from the current or a previous delivery) so that no remote source fluids will be used that may not be compatible with the cargo or the cargo containment. Since the displacement gas is a side-stream off the cargo fluid, there is no concern about mixing between the displacement fluid and the cargo being displaced. After the displacement operation has been completed, scavenging may be used to limit residual gas in the containers prior to departure to limit the mass of natural gas to little more than what would be needed to provide fuel for the return trip if natural gas is the cargo and is, therefore, what has been used as the topside displacement fluid.

Figure 4A:
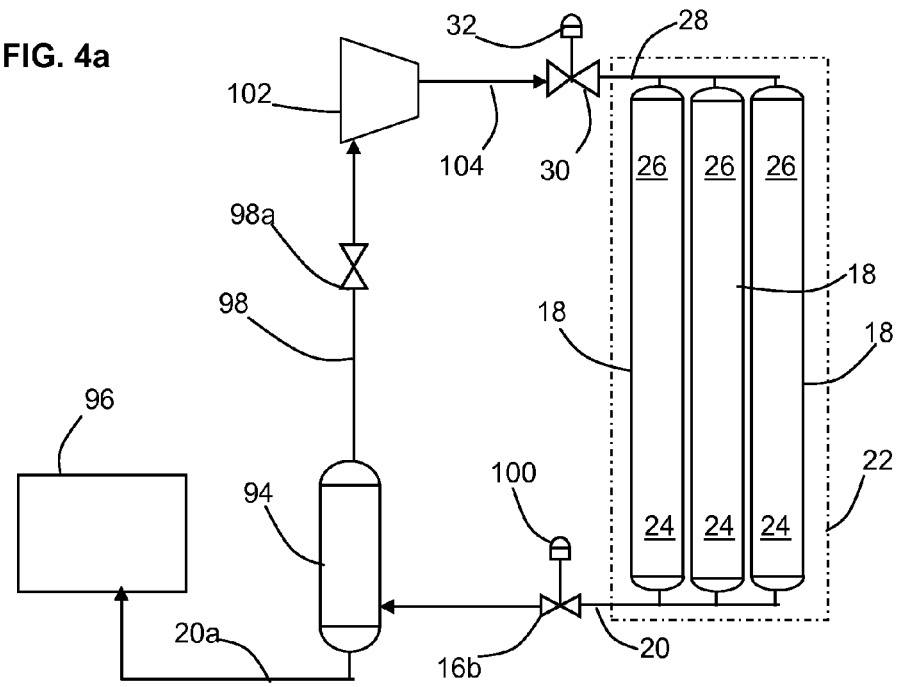
FIG. 4a is a schematic flow diagram for illustrating a method for discharging a compressed fluid out of containment, where a compressor is used to make a displacement fluid from a portion of the compressed fluid, according to the present invention.
Figure 4B:
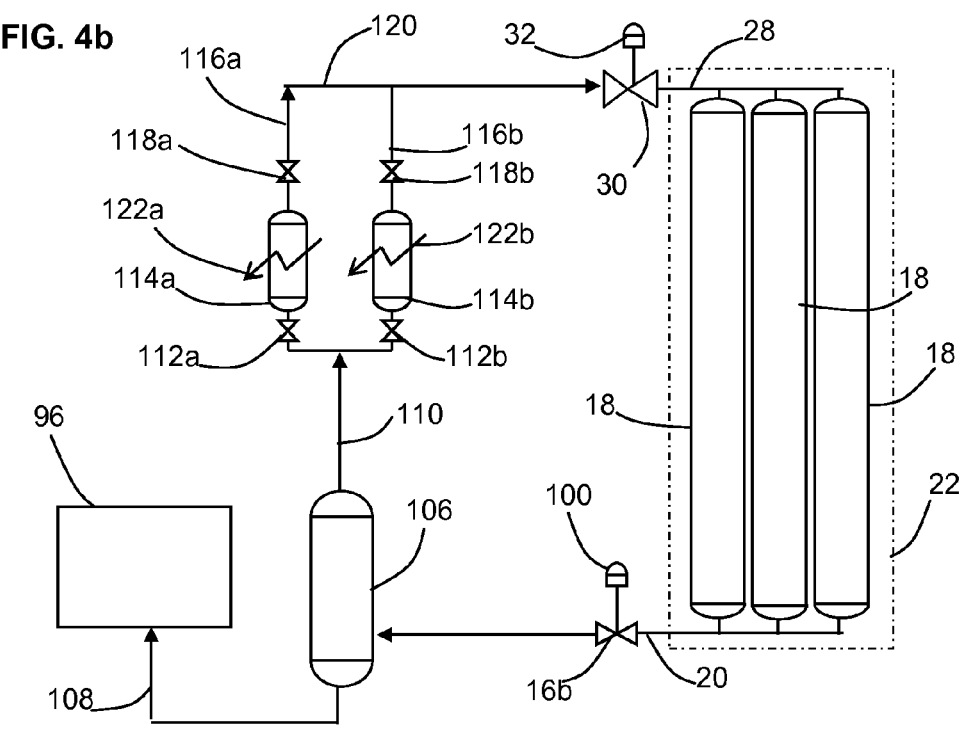
FIG. 4b is a schematic flow diagram for illustrating a method for discharging a compressed fluid out of containment, where a pair of heated vessels are used to make a displacement fluid from a portion of the compressed fluid, according to the present invention.

With reference to FIGS. 4a and 4b, this method for discharging the fluid cargo is described in more detail. In FIG. 4a, dense fluid or liquid (possibly NGL's) at the bottom 24 of cargo containers 18 is under a gas cap in the upper portion 26 of containers 18. To start the cargo discharge process, a discharge flow path is provided from containers 18 by opening bottom-side isolation/segregation valves (not shown) and main discharge valve assembly 16b under flow control of device 100 through pipe 20 to a separator 94. Separator 94 separates the cargo discharge stream into a higher density gas stream 94a, which passes through pipe 20a to receiving facilities 96, and a lower density gas stream 94b, which passes through pipe 98. A positive pressure differential initiates discharge to the receiving facilities 96. A flow and pressure control device 100 on valve assembly 16b (or within the receiving facilities) may be included to drop flowing pressure, if necessary, to within an upper pressure limit of the receiving facilities 96 (e.g., a fractionation plant or receiving pipeline).

If the pressure within containers 18 is inadequate to discharge the initial liquid portion of the cargo off the ship to the receiving facilities 96, a pump may be included in line 20a to provide any necessary additional pressurization to remove the dense fluids from the bottom of the tanks 18 to a remote storage or process facility if extra transfer energy is required. All tanks onboard may be discharged simultaneously if desired.

With reference to FIG. 4a, after the liquid portion of the cargo has been discharged, a gaseous cargo fluid discharges under the pressure within containers 18 through lines 20 and 20a to receiving facilities 96. After the pressure in containers 18 falls to a level below that necessary to maintain the desired rate of discharge into the receiving facilities 96, a valve 98a is opened in line 98, and lower density gas stream 94b, which is stripped out of discharging cargo by separator 94, is fed to a compressor 102. Compressor 102 pressurizes and warms the lower density gas stream to form a displacement fluid. The displacement fluid flows through a line 104, topside valve assemblies 30 under flow control of device 32 and piping 28 into the top of containers 18, where the higher pressure of the displacement fluid forces the colder gaseous cargo fluid in the bottom of containers 18 to discharge out to receiving facilities 96. The temperature and pressure of the displacement fluid should be high enough to ensure that by injecting this warmer, lighter displacement fluid into the tops of containers 18, the remaining colder gaseous cargo fluid can be displaced out of the bottom flow path 20. The displacement fluid is fully compatible with the cargo fluid because it is merely a pressurized portion of cargo fluid.

To summarize, initially, liquid cargo fluid is pushed out of the bottom of containers 18 by the pressure of gaseous cargo fluid in containers 18 above the liquid portion. The liquid cargo portion flows through and out the bottom of separator 94 to receiving facilities 96. If necessary or helpful, a pump can be used in either line 20 or line 20a to pump the liquid portion of the cargo that is discharged. After the liquid portion is discharged, cold, gaseous cargo fluid can begin to discharge out the bottom of container 18 by unassisted blowdown and flow through pipe 20 through and out the bottom of separator 94 to receiving facilities 96. When there is no longer enough stored pressure energy in containers 18 for the cargo fluid to drive flow effectively over into the receiving facilities 96, valve 98a can be opened so that the lower density gas stream from separator 94 can flow through line 98 to compressor 102, which raises the pressure and temperature of the lower density gas stream to form the displacement fluid. The displacement fluid flows into the top of containers 18, where it raises the pressure sufficiently to force the colder, denser gaseous cargo fluid in the bottom of containers 18 out the bottom of the cargo containers 18 through pipe 20 to the receiving facilities 96. In some situations, receiving facilities 96 may provide a suitable and economical displacement fluid, but with the present invention, a portion of cargo fluid itself may be separated, compressed and used as a displacement fluid to provide a self-contained, continuous cycle for discharging a compressed fluid cargo.

If a lean natural gas (more than 95% methane) is being injected to discharge a very cold rich natural gas and NGL cargo, then the lean gas stream can be nearly as cold as the stored cargo fluid (within about 25° C.) at the start of the displacement process to protect the cargo containment and piping systems from excessive thermal shock. As the cargo piping and the fluids contained within the storage system become lighter and warmer, the temperature of the gas stream being injected can be gradually increased to maintain the density difference needed to remain principally at the top of the containers while the cargo is being discharged out the bottom.

The temperature of the displacement gas should be carefully controlled so that piping and cargo tanks are not thermally shocked. It may be practiced that progressively warmer displacement gas is used to maintain the desired density differential between it and the gas remaining in the cargo containers. At the end of the displacement operation, the last quantities of displacement gas being injected to the containers may be very warm relative to the temperature used for storage and transport (e.g., >40° C.).

Separation and possibly fractionation equipment (as well as heating elements) to process the discharging cargo fluid stream as needed for consumers at the receiving port may be provided on ship and/or as part of the shore-based receiving facilities. The warm, light displacement gas injected through the topside piping will tend to stay at the top of the containers driving the colder, denser fluids out the bottom.

Cargo unloading is completed by injecting warmer and warmer gas into the containers until all the cold cargo has been removed. This may be done by injecting to all containers simultaneously or by a step-wise process where valve-isolated groups of containers (tanks) are discharged in sequence.

Since the containers and cargo spaces are relatively cold compared to the gas being injected at the top, the injected gas will cool within containment and tend to drop toward the outlet. The more slowly gas is injected the more it will cool while it is pushing cargo from the containers. Containment space chilling may be turned off or reduced to limit this tendency, but the containers themselves tend to be massive heat sinks. Since the amount of residual gas onboard should be minimized (with an allowance for fuel requirements), the pressure and temperature of the gas in the containers should be managed as the discharge of cargo is completed and the containers are shut in for the return voyage. Therefore, sequential tier by tier (or tank by tank) discharging operations would be preferred for the displacement phase because the warmest gas can be injected very quickly just before each tier/tank (or interconnected group of containers) is isolated by valve operation. Once isolated in a container, the internal pressure will drop as the residual gas cools, but the contained mass does not change unless some of it is extracted for fuel.

The present invention also provides a method for discharging a compressed fluid without using a mechanical compressor. A displacement gas stream can be separated/stripped off the discharging cargo flow stream to be warmed and pressurized such that it may be directed into the top of the tier/tanks being discharged without the use of rotating equipment. A separator (whether implementing gravity or circumferential force separation) is included in the flow path such that at least a part of the lighter gaseous phase coming out of the containment may be directed into a number of (at least two) isolatable reservoirs (actually, pressure vessels) where the gas may be heated.

With reference to FIG. 4b, the process for discharging cargo without a mechanical compressor is similar to the process described with reference to FIG. 4a. The cargo discharge process starts with liquid cargo discharging out the bottom of cargo containers 18 due gas pressure in the upper portion of containers 18. A discharge flow path is provided from containers 18 through pipe 20 to a separator 106 by opening bottom-side isolation/segregation valves (not shown) and main discharge valve assembly 16b. The liquid cargo portion flows through and out the bottom of separator 106 to receiving facilities 96 through a line 108, and a pump can be used if desired. After the liquid portion is discharged, cold, gaseous cargo fluid will blow down out the bottom of container 18 and flow through pipe 20 through and out the bottom of separator 106 to receiving facilities 96.

When the pressure in containers 18 decreases to the point that flow to the receiving facilities is too low, separator 106 can be used to separate the cargo discharge stream into a higher density gas stream 106a, which passes through pipe 108 to receiving facilities 96, and a lower density gas stream 106b, which passes into a pipe 110. By opening a valve 112a, the lower density gas stream 106b will flow through line 110 through valve 112a into a vessel 114a. A pipe or line 116a connects vessel 114a through a valve 118a to a header 120. A valve 112b, a vessel 114b, a line 116b and a valve 118b are provided in parallel to vessel 114a and its associated lines and valves to provide two flow paths for the lower density gas stream through line 110 out of separator 106 to header 120. One flow path is through vessel 114a and the other is through vessel 114b. Header 120 is connected to valve 30, which can be opened or closed by controller 32, to provide a fluid flow path to topside piping manifold 28 for flow into the top of containers 18.

Vessels 114a and 114b are used to pressurize the lower density gas stream 106b from separator 106 to form a displacement fluid that flows at a higher pressure into the top of containers 18 to force cold, gaseous cargo fluid out the bottom of containers 18. Vessels 114a and 114b are used alternately. With valve 112a open and valves 112b and 118a closed, the lower density gas stream 106b will flow through line 110 through valve 112a into vessel 114a. After the pressure in separator 106 and vessel 114a have nearly equalized and the flow rate is low, valve 112a is closed, which traps a quantity of gas in vessel 114a. Vessel 114a is then heated using heat input 122a, which raises the pressure of the gas trapped inside vessel 114a. After the pressure inside vessel 114a has been increased to a desired level, no further heat is added, and valve 118a is opened. The heated and pressurized gas that had been trapped in vessel 114a flows out through line 116a into header 120 through valve 30 and topside manifold 28 into the top of containers 18 as a displacement fluid. The displacement fluid should be at a proper pressure to force cold, gaseous cargo out through the bottom of container 18.

Continuing to reference FIG. 4b, vessel 114a discharges its pressurized charge of displacement gas thusly through open valve 118a over to the topside of the containment onboard ship. While vessel 114a is heated and its gas contents discharged, vessel 114b is filled through valve 112b against closed valve 118b with gas from separator 106. As soon as vessel 114b is filled with gas, valve 112b can be closed to isolate vessel 114b. Vessel 114b is then heated with heat input 122b to elevate the pressure of the gas in vessel 114b enough to provide the necessary driving force required to continue displacement operations when the pressure in vessel 114a becomes too low to continue the discharging operation effectively. The rate of heat input to vessel 114b should be selected and controlled to ensure that its internal pressure has reached the level required to serve the cargo displacement function by the time the pressure in vessel 114a has dropped to the point where it can no longer maintain the targeted flow rate of the displacement fluid into the top of containers 18 through flow control element 32 and valve 30.

When the pressure in vessel 114b is such that it can take over as the source of the displacement gas, then valve 118a can be closed and valve 118b can be opened to begin the discharge of vessel 114b. Also, then valve 112a can be opened to allow the filling of vessel 114a. Vessels 114a and 114b are used alternately such that while one is filled and heated, the other discharges its heated and pressurized gas to the top of containers 18 to drive more cargo fluid out the bottom of containers 18 to receiving facilities 96.

Figure 5:
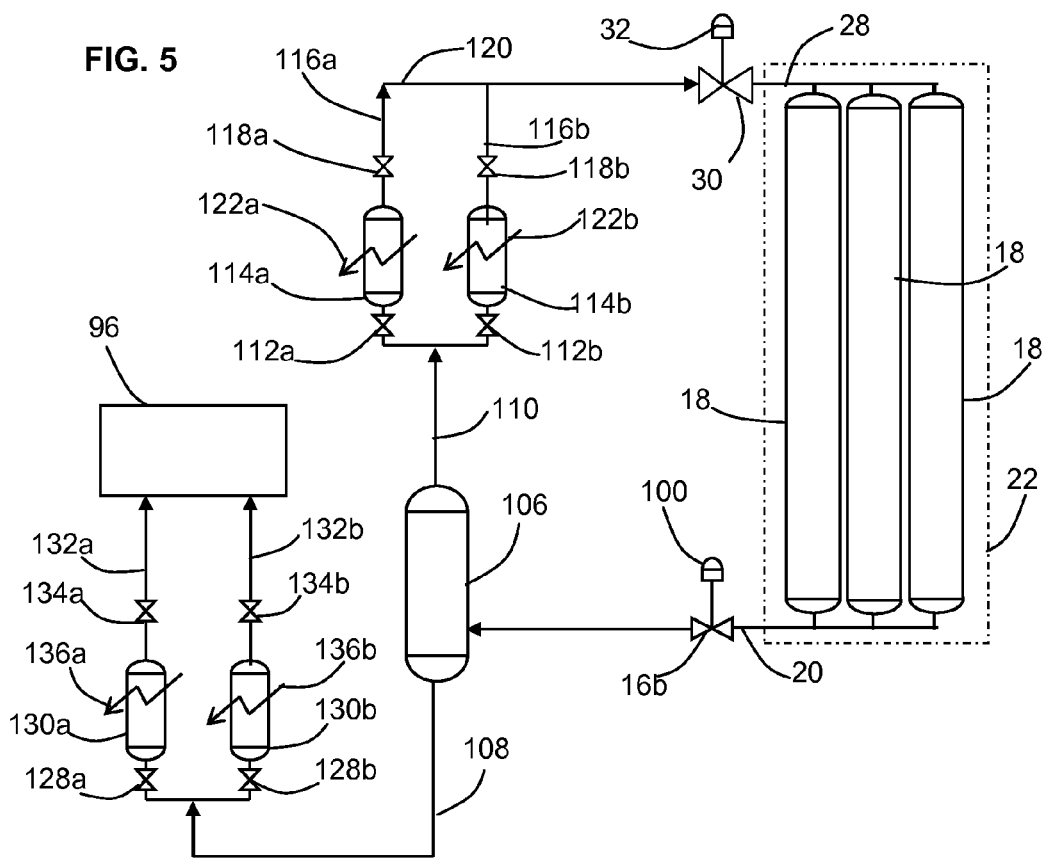
FIG. 5 is a schematic flow diagram for illustrating a method for using a pair of heated vessels to increase the pressure of a gaseous fluid for forcing the fluid into a receiving facility, according to the present invention.

FIG. 5 shows a similar concept for pressurizing discharged cargo fluids to the pressure level needed to push the cargo fluids through the receiving facilities and onward to and/or through pipeline systems at the receiving market without using rotating equipment. In addition to the at least two heat exchanging vessels 114a and 114b on the displacement gas side, at least two additional isolatable reservoirs/vessels 130a and 130b are inserted on the primary cargo flow path. In FIG. 5, vessel 130a has been filled through a valve 128a and is discharging its contents as a warmed and pressurized stream 132a to receiving facilities 96 (the market infrastructure and customers) through an open valve 134a after being heated with a heater 136a while vessel 130b is being charged with cargo fluid against a closed valve 134b via an open valve 128b. Once vessel 130b has been charged and isolated, the rate of heat input through a heater 136b to vessel 130b should be selected and controlled to ensure that its internal pressure has reached the level required to drive cargo transfer into the market by the time the pressure in vessel 130a has dropped to the point where it can no longer maintain a targeted minimum discharge rate. Use of heater vessels 130a and 130b is alternated to keep a reasonably steady flow of cargo discharging to the receiving facilities 96. After gas in vessel 130b is heated with valve 128b closed, valve 134b is opened, and a warmed and pressurized stream 132b flows to receiving facility 96. As stream 132b begins to flow and then flows to receiving facility 96, valve 134a is closed, valve 128a is opened, and vessel 130a is again filled with discharging cargo gas. After vessel 130a is filled with cargo gas and while vessel 130b is discharging, valve 128a is closed to trap gas in vessel 130a, which is then heated by heat input 136a.

It should be noted that all of the separators and pressure vessels described in the preceding may be located on board the transporter or on shore, and there can be advantages in placing some or all of the just noted separators and heat exchanging pressure vessels on board. For example, if the pressure vessels 106, 114a, and 114b are located on board ship, the can serve as reservoir to accumulate gas that might be relief vented from the cargo containment system during transit. If enough gas accumulates in 114a and 114b prior to start of discharge operations, it is likely to be warm enough at the start of discharge operations to serve as displacement gas. When displacement gas is required to support discharge operation, it is likely that seawater from seachests or waste heat from the engine room can serve as convenient sources of heat energy to warm the displacement gas on ship.

Both of the cargo discharging operations just introduced end up with a quantity of warm pressurized displacement gas within the cargo containers at the end of the displacement operation. Once the desired quantity (possibly all) of the cold cargo fluids have been discharged by the warm gas displacement operation, it is possible to recover some of the warm CNG that was used to drive out the cargo by scavenging. A scavenging compressor can withdraw the warm gas from the cargo containers down to a desired residual or heel pressure value for the return voyage/trip. It is possible that selected tanks will be left at a relatively high pressure at the end of scavenging operations to serve as a fuel supply for the ship.

By using hot displacement gas, only limited scavenging would be required. The fact that relatively warm gas is being scavenged limits the low-end pressure at which scavenging may be stopped while still limiting the mass of residual gas. Scavenging should be accomplished on a tier-by-tier level very soon after a tier has completed the discharging process to limit heat loss from the displacement gas before scavenging recovery is started.

Gas containment is prepared for return voyage with the targeted quantity of heel gas on board. By not scavenging gas from all the tanks, it is possible to depart with higher pressure fuel gas stored in one or more tanks if local valves are installed to allow the necessary isolation. Fuel gas on the return trip would be recovered from the fuel storage containers in a manner similar to that described for the delivery voyage.

The heel gas may still be relatively warm at the end of discharging (and scavenging) operations as compared to the temperatures of the container skin and hold space environment. Therefore, the temperature and pressure of the heel gas remaining in the cargo containers will be dropping as heat is exchanged to the tank skin and extracted by the hold space cooling system.

An alternative approach for initiating discharge would have the topside valve assembly 30 open first to allow the warmest high pressure gas at the top of the containers to flow off the ship at a rate controlled by flow control device 32. As pressure and temperatures drop in the containers, some liquids may fall out. After pressure has dropped as low as the back pressure from the receiving facilities dictates, the remaining excess pressure in containment can be used to drive any liquids in the cargo containers out to appropriate receiving/holding facilities at port through the bottom piping.

A method has been introduced for achieving all the benefits of using displacement operations during cargo loading where all the disadvantages of having to acquire and manage a large reserve of displacement liquid have been eliminated. Low density gas being displaced by the injection of the cold cargo fluids has the same pressure management benefit as a liquid displacement operation with regard to avoiding heat of compression effects in storage when the storage containers are being filled.

By using part of the discharging cargo flow stream to aid in the discharging process, there is no concern about finding an adequate supply at the receiving port or about putting a contaminating stream from an alternative source into the cargo containment and handling system. A method for acquiring and pressurizing the displacement gas without the need for mechanical compression has been introduced. Also, by using the warm, low density gas as the displacement fluid, the need for a scavenging process may be eliminated.

The preceding text has described innovative means for loading to and discharging from stationary or transportable cargo containers. Having described the invention above, various modifications of the techniques, procedures, materials, methods and equipment will be apparent to those skilled in the art. It is intended that all such variations within the scope and spirit of the invention be included within the scope of the appended claims.

What is claimed is:

1. A method for loading a compressed fluid into a container, comprising:
    injecting a displacement fluid into a first tank, the first tank having an upper portion and a lower portion, wherein the displacement fluid is a gas;
    injecting the displacement fluid and/or a compressed fluid into the first tank until a desired pressure is reached in the first tank
    cooling and injecting the compressed fluid into the lower portion of the first tank;
    bleeding the displacement fluid out of the upper portion of the first tank after the desired pressure is attained while continuing to inject the compressed fluid into the lower portion of the first tank;
    adjusting the flow rate of the displacement fluid bled out of the upper portion of the first tank to maintain the pressure in the first tank within a desired range about the desired pressure; and
    cooling and injecting the compressed fluid into the lower portion of the first tank until a desired mass of the compressed fluid is contained in the first tank while bleeding the displacement fluid out of the upper portion of the first tank,
    wherein the pressure of the desired mass of the compressed fluid contained in the first tank is between 100 and 2,000 psig.

2. The method of claim 1, further comprising maintaining a desired temperature of the compressed fluid prior to injecting the compressed fluid into the first tank.

3. The method of claim 1, wherein the compressed fluid flows through a Joule-Thompson let-down valve prior to injecting it into the first tank.

4. The method of claim 1, wherein the compressed fluid is cooled by passing it through a refrigerated heat exchanger.

5. The method of claim 1, wherein the compressed fluid is cooled by injecting a cold liquid fluid into the compressed fluid prior to injecting the compressed fluid into the first tank.

6. The method of claim 5, wherein the cold liquid fluid has substantially the same chemical composition as the compressed fluid.

7. The method of claim 1, wherein the displacement fluid bled from the upper portion of the first tank flows into a second tank.

8. The method of claim 7, further comprising shutting in the first tank while at substantially the same time initiating injection of the compressed fluid stream into the second tank.

9. The method of claim 8, wherein the second tank has an upper portion and a lower portion, wherein the compressed fluid is injected into the lower portion of the second tank, and wherein the displacement fluid bled from the upper portion of the first tank flows into the upper portion of the second tank, further comprising allowing the pressure in the second tank to rise to the desired pressure; and bleeding gas out of the upper portion of the second tank after the desired pressure has been attained and while continuing to inject the compressed fluid into the lower portion of the second tank.

10. The method of claim 9, further comprising manipulating the flow rate of the gas bled out of the upper portion of the second tank to maintain the pressure in the second tank within the desired range of pressure about the desired pressure.

11. The method of claim 1, wherein the compressed fluid is compressed natural gas, and wherein the first tank is located on or in a marine vessel.

12. The method of claim 1, wherein the compressed fluid is a compressed natural gas in a pipeline, and wherein the first tank is located on or in the earth.

13. The method of claim 1, further comprising:
compressing natural gas to form the compressed fluid;
cooling the compressed fluid;
maintaining the temperature of the compressed fluid at a point prior to injection into the first tank within about 50° C. of the bulk mass average temperature in the first tank;
storing the compressed fluid under dense phase conditions in the first tank after the desired mass of the compressed fluid has been attained in the first tank; and
transporting the first tank to a desired location.

14. A method for loading natural gas into a tank, comprising:
providing a flow path from a source of a compressed natural gas (CNG) to a tank, the tank having an upper portion and a lower portion;
injecting the CNG into the tank under a first set of desired pressure and temperature conditions;
forming a displacement gas inside the tank;
continuing to inject the CNG until a desired pressure is attained in the tank;
withdrawing the displacement gas from the upper portion of the tank after attaining the desired pressure in the tank;
maintaining the pressure in the tank within a desired range about the desired pressure in the tank by adjusting the flow rate of the displacement gas withdrawn from the upper portion of the tank while injecting the CNG into the lower portion of the tank under a second set of desired pressure and temperature conditions, wherein the second set of desired pressure and temperature conditions is different from the first set of desired pressure and temperature conditions; and
filling the tank with a desired mass of CNG.

15. The method of claim 14, further comprising:
cooling the compressed natural gas before injecting the compressed natural gas into the lower portion of the tank under the second set of desired pressure and temperature conditions, the cooling step including a Joule-Thompson let-down valve for cooling the compressed natural gas; and
maintaining the temperature of the compressed fluid at a point prior to injection into the tank within about 60° C. of the bulk mass average temperature in the tank.

16. The method of claim 15, wherein a heat exchanger and a refrigeration fluid that circulates through the heat exchanger is used for cooling the compressed natural gas in addition to the let-down valve.

17. The method of claim 15, wherein a cold, liquid natural gas is injected into the flow path between the let-down valve and the tank.

18. The method of claim 15, further comprising:
determining the chemical composition of the natural gas;
determining a desired bulk average target temperature in the tank that corresponds to a desired mass of gas at the desired pressure in the tank;
ceasing injecting compressed natural gas into the tank when the temperature in the tank drops to the desired bulk average target temperature; and
ceasing withdrawing the displacement gas from the tank when the temperature in the tank drops to the desired bulk average target temperature.

19. The method of claim 14, further comprising:
cooling the compressed natural gas (CNG) before injecting the CNG into the lower portion of the tank under the second set of desired pressure and temperature conditions, wherein the cooling step is selected from the group consisting of:
passing the CNG through a Joule-Thompson let-down valve;
adjusting the pressure drop across the let-down valve;
passing the CNG through a refrigerated chiller;
adjusting the refrigeration load of the refrigerated chiller;
injecting a cryogenic liquid into the CNG; and
adjusting the flow rate at which cryogenic liquid is injected into the CNG.

20. The method of claim 19, further comprising providing one or more additional containers that each have an upper portion, the one or more additional containers being arranged in a parallel flow configuration with the tank, wherein the displacement gas withdrawn from the upper portion of the tank is directed into the upper portion of at least one of the one or more additional containers.

21. The method of claim 19, further comprising:
providing an insulated enclosure, wherein the tank is received in the insulated enclosure; and
providing a cool fluid in the inside of the insulated enclosure around the tank for removing heat from the tank.

22. The method of claim 21, further comprising circulating the cool fluid for increasing heat removal from the tank.

23. The method of claim 22, wherein the tank has an external surface adapted to enhance heat transfer from the tank.

24. The method of claim 14, wherein the tank is received in a cargo hold in a marine vessel, and wherein the desired pressure in the tank is a final targeted storage pressure for transport of the tank, further comprising:
providing one or more additional containers in the cargo hold that each have an upper portion, the one or more additional containers being arranged in a parallel flow configuration with the tank, wherein displacement gas withdrawn from the upper portion of the tank is directed into the upper portion of at least one of the one or more additional containers, and loading the compressed natural gas into the one of the one or more additional containers using the same method as used to fill the tank until a desired mass of compressed natural gas is loaded into the one or more additional containers.

25. The method of claim 24, further comprising insulating the cargo hold; and providing a chilled fluid inside the insulated cargo hold and outside the tank and the one or more additional containers for extracting heat from the tank and the one or more additional containers.

26. The method of claim 14, further comprising:

cooling the compressed natural gas (CNG) before injecting the CNG into the lower portion of the tank under the second set of desired pressure and temperature conditions, wherein a cold, liquid natural gas is injected into the flow path of the CNG, providing a container that has an upper portion and a lower portion, the container being arranged in a parallel flow configuration with the tank, wherein displacement gas withdrawn from the upper portion of the tank is directed into the upper portion of the container;

ceasing injecting the CNG into the tank;

ceasing withdrawing displacement gas from the upper portion of the tank;

injecting the CNG into the lower portion of the container after ceasing injecting the CNG into the tank;

withdrawing a liquefied natural gas stream from the lower portion of the tank after ceasing injecting the CNG into the tank; and injecting the liquefied natural gas stream into the CNG prior to injecting the CNG into the lower portion of the container.

27. A method for loading a compressed fluid into a container, comprising:

injecting initially a compressed fluid stream into a tank under conditions where the pressure of the compressed fluid is substantially higher than the pressure in the tank, the tank having an upper portion and a lower portion, wherein the compressed fluid stream is injected into the lower portion, and wherein the compressed fluid stream initially expands inside the tank to become a displacement gas, the temperature of the compressed fluid stream entering the tank being substantially lower than the temperature of the displacement gas;

continuing to inject the compressed fluid stream into the tank until a desired pressure is reached in the tank;

discharging the displacement gas out of the upper portion of the tank after the desired pressure is reached in the tank;

injecting the compressed fluid stream into the tank under conditions where the pressure of the compressed fluid is not substantially higher than the pressure in the tank after the desired pressure in the tank is reached;

continuing to bleed the displacement gas out of the upper portion of the tank while continuing to inject the compressed fluid stream into the lower portion of the tank;

adjusting the flow rate of the displacement gas bled out of the upper portion of the tank to maintain the pressure in the tank within a desired range about the desired pressure; and continuing to inject the compressed fluid stream into the tank until a desired mass of compressed fluid is loaded into the tank.

28. The method of claim 27, wherein the desired pressure is between 100 and 2,000 psig, further comprising managing the temperature of the compressed fluid stream within a desired range about a desired temperature at a point before injection into the tank.

29. The method of claim 27, wherein the tank has a substantially rectangular cross-section with four side walls joined together with rounded corner panels, and wherein the side walls are designed to allow expansion outwardly more than the thickness of the side wall when the tank is pressurized to the desired pressure.

30. The method of claim 14, wherein the tank has a substantially rectangular cross-section with four side walls joined together with rounded corner panels, and wherein the side walls can expand outwardly more than the thickness of the side wall when the tank is pressurized to the desired pressure.

31. The method of claim 1, wherein the first tank has a substantially rectangular cross-section with four side walls joined together with rounded corner panels, and wherein the side walls can expand outwardly more than the thickness of the side wall when the first tank is pressurized to the desired pressure.

32. The method of claim 31, wherein the first tank is received in a cargo hold in a marine vessel, and wherein the desired pressure in the first tank is a final targeted storage pressure for transport of the first tank, further comprising:

providing one or more additional tanks in the cargo hold that each have an upper portion, the one or more additional tanks being arranged in a parallel flow configuration with the first tank, wherein displacement fluid bled from the upper portion of the first tank is directed into the upper portion of at least one of the one or more additional tanks, and loading the compressed fluid into the one of the one or more additional tanks using the same method as used to fill the first tank until a desired mass of compressed fluid is loaded into the one or more additional tanks, wherein the one or more additional tanks have a substantially rectangular cross-section with four side walls joined together with rounded corner panels, and wherein the side walls are designed to allow expansion outwardly more than the thickness of the side wall when the one or more additional tanks are pressurized to the desired pressure.

33. The method of claim 32, wherein the cargo hold is defined by cargo support structure, wherein the cargo hold contains more than two tanks, and wherein the wall section of each tank is supported externally by either or both of an adjacent tank or the cargo support structure.

* * * * *